Sept. 23, 1958  R. G. COOK  2,853,257
AUTOMATIC AIRCRAFT HOLDBACK RELEASE DEVICE
Filed June 22, 1956  4 Sheets-Sheet 1
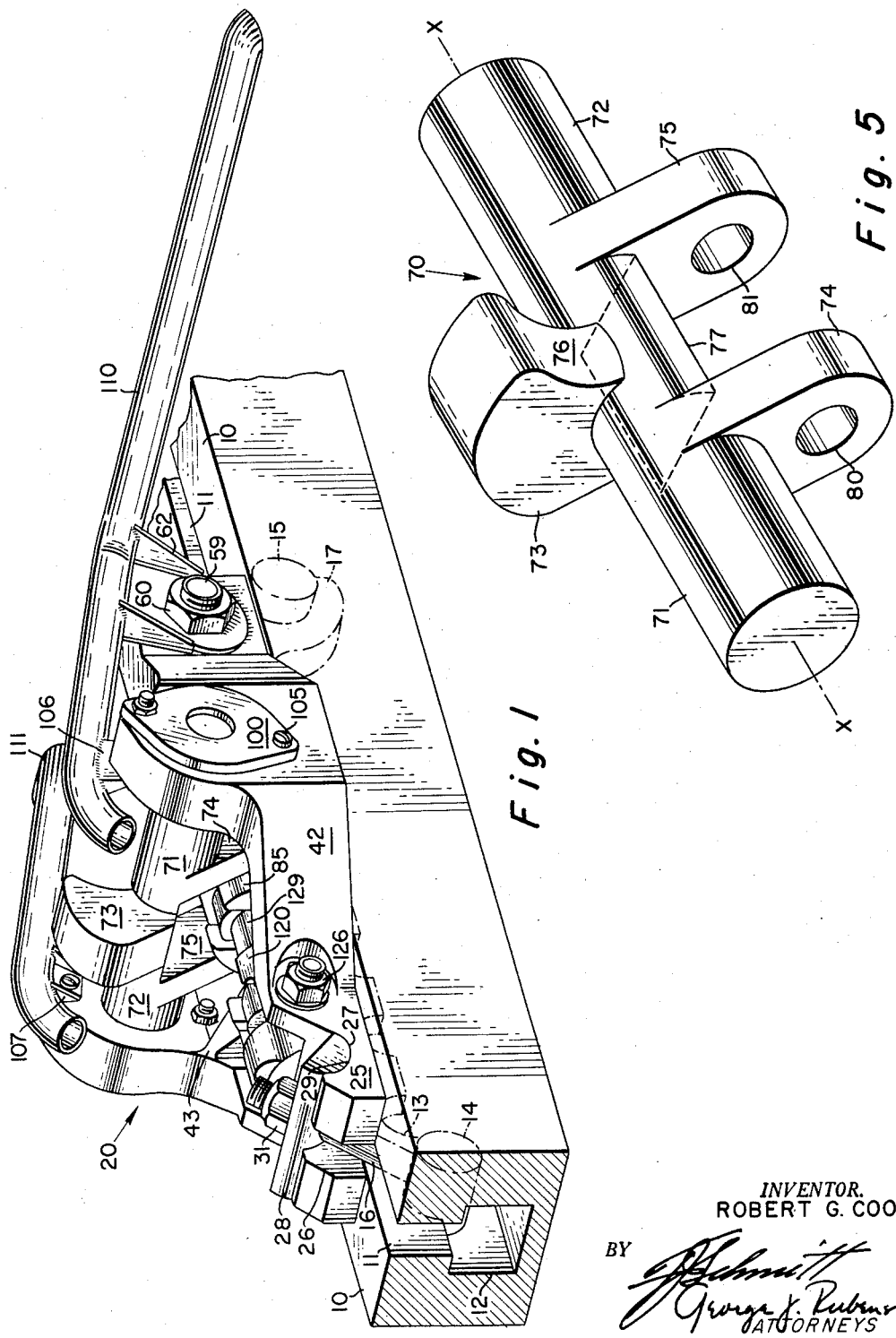
INVENTOR.
ROBERT G. COOK
BY
ATTORNEYS Sept. 23, 1958 R. G. COOK 2,853,257
AUTOMATIC AIRCRAFT HOLDBACK RELEASE DEVICE
Filed June 22, 1956 4 Sheets-Sheet 2
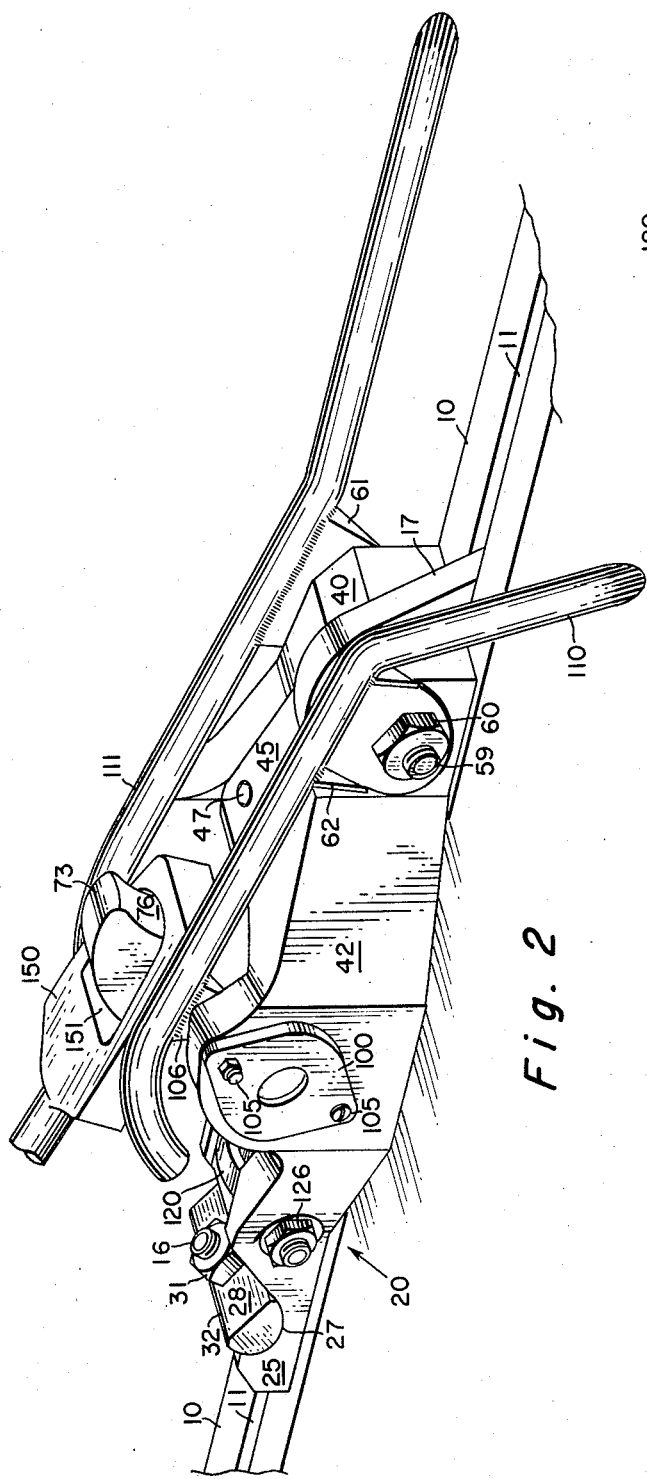
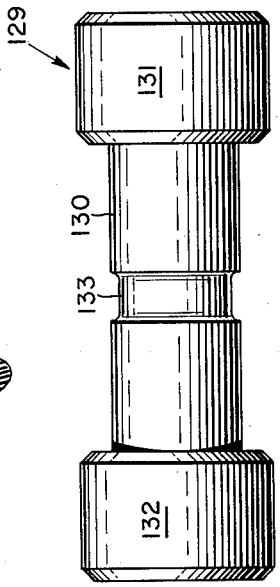
INVENTOR.
ROBERT G. COOK
BY
ATTORNEYS Sept. 23, 1958    R. G. COOK    2,853,257
AUTOMATIC AIRCRAFT HOLDBACK RELEASE DEVICE
Filed June 22, 1956    4 Sheets-Sheet 3

INVENTOR.
ROBERT G. COOK
BY
*ATTORNEYS*

Sept. 23, 1958   R. G. COOK   2,853,257
AUTOMATIC AIRCRAFT HOLDBACK RELEASE DEVICE
Filed June 22, 1956   4 Sheets-Sheet 4
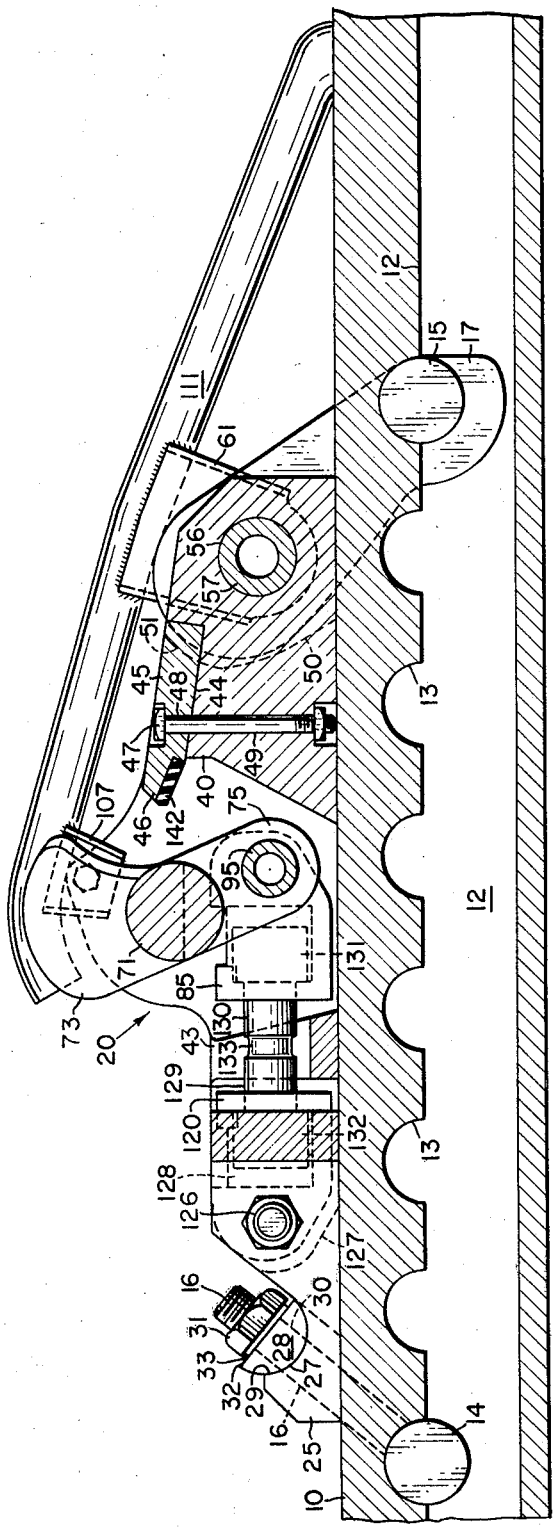
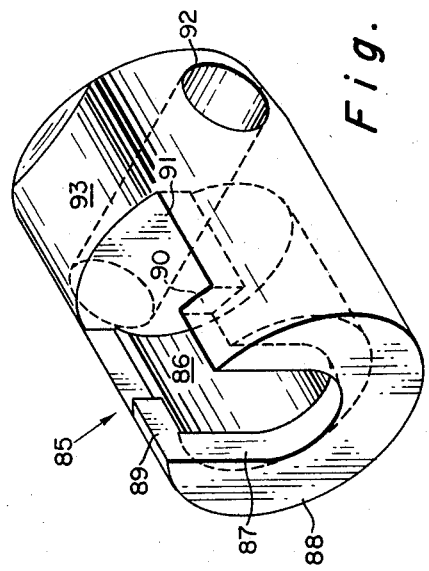
INVENTOR.
ROBERT G. COOK

United States Patent Office 2,853,257
Patented Sept. 23, 1958

2,853,257

AUTOMATIC AIRCRAFT HOLDBACK RELEASE DEVICE

Robert G. Cook, Redondo Beach, Calif., assignor, by mesne assignments, to the United States of America as represented by the Secretary of the Navy Application June 22, 1956, Serial No. 593,305

7 Claims. (Cl. 244—110)

The present invention relates to an automatic holdback release device and more particularly to an automatic holdback device employing a compact construction wherein two coupon retaining members are pivotally supported on a body member and are so constructed and arranged that the portions of a coupon utilized with the device are constrained in their movement subsequent to rupture of the coupon during operation.

The invention device is particularly adapted for use on aircraft carriers where it is necessary to provide a holdback release device for restraining aircraft from forward movement during catapult operations until a predetermined thrust is developed, whereupon the release device automatically releases the aircraft and allows it to be catapulted forward. Aircraft in use on carriers are provided with downwardly extending pendants mounted in the rear of the fuselage of the aircraft for engaging suitable holdback devices.

Holdback devices currently in use on aircraft carriers employ a plurality of cables one of which is anchored to the deck and another of which is adapted to engage the pendant of an aircraft, the two cables being connected by a frangible coupon which is formed such that it will rupture when subjected to a predetermined force which in this case is the forward thrust of the aircraft. Such cable and coupon arrangements are extremely clumsy and require personnel to secure the devices to the aircraft rather than being automatic in operation. Furthermore, such arrangements are extremely dangerous to equipment and personnel due to the fact that upon rupture of the coupon the cables and the coupon may fly in an uncontrolled manner about the deck of the ship.

The present invention employs a compact arrangement wherein coupons are utilized which are identical with those employed in the prior art such that conventional coupons need not be modified for use with the invention device. Two coupon retaining members are pivotally supported by a body means which has a plurality of bolts pivotally secured thereto whereby the body means may be quickly and rigidly secured to the deck of a ship. Each of the coupon retaining members has a cavity formed therein and a slot formed in the end thereof to receive the body of a coupon member inserted in the device; and each of these coupon members are additionally provided with circumferentially extending shoulders formed thereon which are adapted to engage the enlarged end portions of the coupon such that the portions of the coupon are restrained in their movement after rupture thereof in operation. In this manner, danger to equipment and personnel from errant cables and coupons which otherwise may fly about in an uncontrolled manner is substantially eliminated.

An object of the present invention is the provision of a new and novel automatic holdback release device which may be easily and rigidly secured to the deck of a ship and which may be automatically engaged by the pilot of the aircraft without requiring additional personnel to secure the device to the pendant of the aircraft.

Another object is to provide an automatic holdback release device which prevents the coupon portions from flying about in an uncontrolled manner after rupture thereof.

A further object is the provision of an automatic holdback release device which is simple and inexpensive in construction, yet sturdy and reliable in operation.

Other objects and many of the attendant advantages of this invention will be readily appreciated as the same becomes better understood by reference to the following detailed description when considered in connection with the accompanying drawings wherein:

Fig. 1 is a perspective view of the invention device as seen from the forward end thereof;

Fig. 2 is a perspective view of the device as seen from the rear end thereof;

Fig. 4 is a sectional view taken along the line IV—IV of Fig. 3 looking in the direction of the arrows;

Fig. 5 is a perspective view of the restraining member of the device;

Fig. 6 is a perspective view of one of the coupon retaining members of the device; and Fig. 7 is an elevation view of a typical coupon member adapted for use with the invention device.

Figure 3:
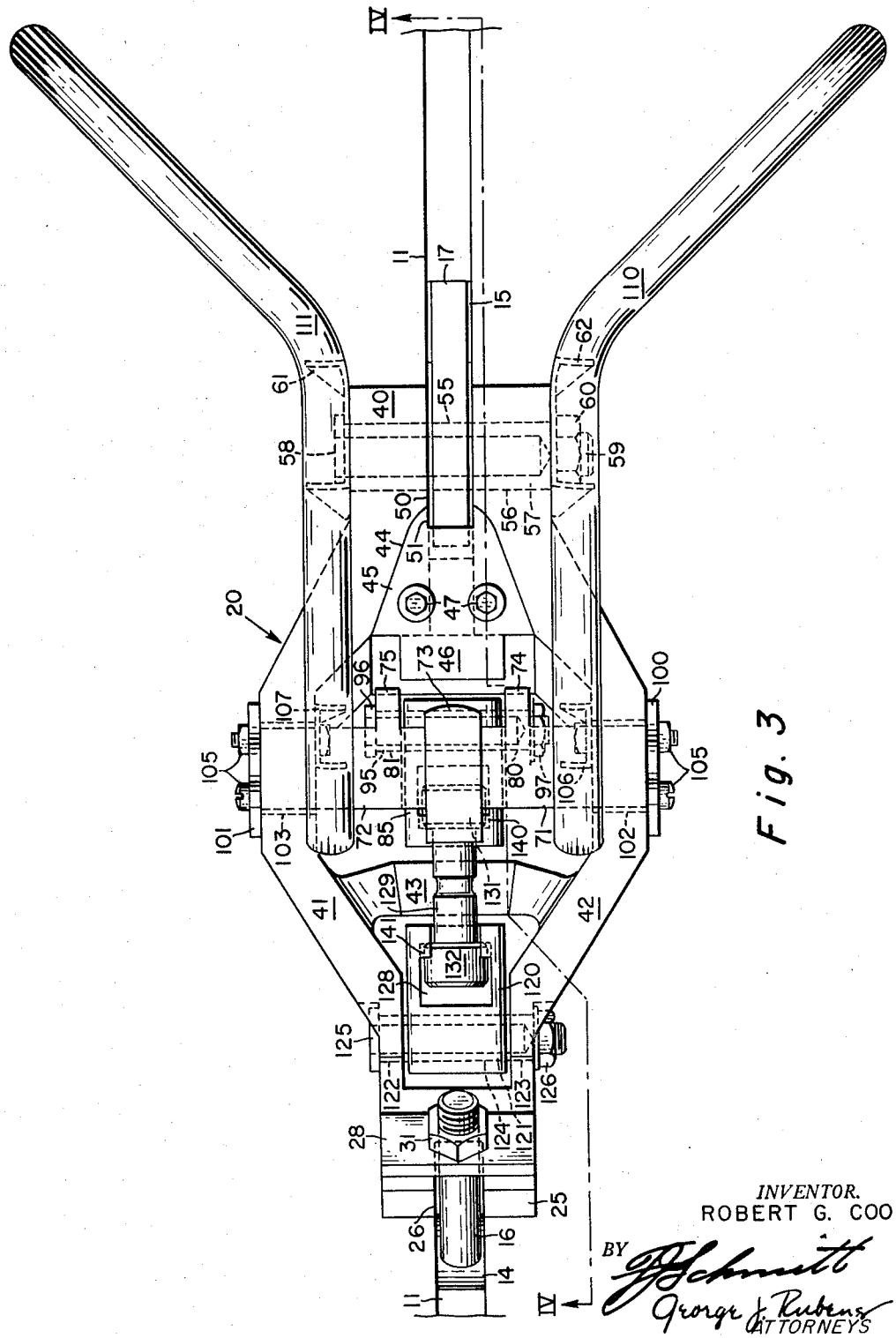
Fig. 3 is a plan view of the device.

Referring now to the drawings, the deck 10 of a ship has a slot 11 formed therein which opens into an enclosed channel 12 formed below the deck of the ship. Opposite walls of the channel are provided with substantially hemispherical cutout portions 13 into which the lower cylindrical end portions 14 of bolt 16, and 15 of link 17 are adapted to extend. The link and bolt extend upwardly through the slot in the deck and are suitably secured to the opposite ends of the body means indicated generally by reference numeral 20 as will hereinafter be more fully described whereby the body means is rigidly anchored to the deck of a ship.

The forward end portion 25 of the body member is provided with a longitudinally extending slot 26 through which bolt 16 extends. End portion 25 is also provided with an arcuately shaped cutout portion 27 which extends laterally of the body member and receives an adapter member 28, the lower surface 29 of which is complementary to portion 27. An opening 30 is provided through adapter 28, and bolt 16 extends through this opening, the upper end of the bolt being threaded and receiving a correspondingly threaded nut 31 which is threaded down against the upper surface 32 of the adapter member 28 through the intermediary of a washer 33 into tight engagement such that the forward end of the body means is securely fixed.

As seen more particularly in Fig. 3, the body member is a unitary member formed for example by forging and comprises the end portions 25 and 40 which are connected by two outwardly extending beams 41 and 42, the area between the beams being hollow. A cross beam 43 extends between beams 41 and 42 and serves to provide additional structural strength to the body means.

As seen in both Figs. 3 and 4, the rear portion 40 of the body member is provided with a cutout 44 which receives a complementary shaped stop plate 45 which fits therein such that the tops of the plate and the rear portion 40 of the body means are flush with one another when in assembled position. The forwardly extending flange 46 formed integral with the stop plate is provided for a purpose hereinafter disclosed. Two nut and bolt assemblies 47 pass through aligned openings 48 and 49 in stop plate 45 and end portion 40 respectively for securing the stop plate in position relative to the body.

A slot 50 is formed longitudinally through end portion 40 and an aligned slot 51 is formed through stop plate 46, these aligned slots having an arcuate sectional configuration as seen most clearly in Fig. 4. As seen in Fig. 4, the upper end of link 17 is arcuate in configuration whereby it is adapted to pivot within slots 50 and 51, and the link member is provided with an opening 55 formed laterally therethrough. End portion 40 is provided with an opening 56 formed laterally therethrough which is adapted to receive a hollow pin 57 which passes through the opening 55 formed in link 17. Pin 57 is provided with a head 58 integral therewith at one end and has a reduced threaded portion 59 formed at the other end thereof. A complementary threaded nut 60 is threaded on end 59 of pin 57 and brackets 61, 62 are clamped between the body means and head 58 and bolt 60 respectively for a purpose which will be hereinafter described.

As seen in Fig. 5, a restraining member indicated generally by reference numeral 70 has two oppositely extending trunnion portions 71 and 72 extending along an axis X—X of the restraining member about which it is adapted to rotate. An upwardly extending hook portion 73 is formed integral with the restraining member and extends substantially normal to axis X—X. A pair of downwardly extending lugs 74 and 75 also extend substantially normal to axis X—X opposite the hook portion 73. Hook portion 73, it should be noted, is provided with an arcuate bearing surface 76 adapted to engage the pendant of an aircraft for restraining the aircraft and further serving to rotate the restraining member upon relative movement between the restraining member and the pendant after rupture of the coupon member of the device. Restraining member 70 is also provided with a cutout portion 77 providing additional space between lugs 74 and 75. Openings 80 and 81 are provided laterally through the lugs for a purpose hereinafter disclosed.

As seen in Fig. 6, a coupon retaining member 85 is provided which is generally cylindrical in configuration and has a cylindrical cavity 86 formed therein. A slot 87 extends radially through one end portion 88 of the coupon retaining member and is in communication with a slot 89 formed longitudinally along the top of member 85. Slot 89 has a shoulder 90 connecting it with a wider slot 91 which also extends longitudinally along the top of retaining member 85. An opening 92 is formed laterally through the other end portion 93 of the retaining member 85 which extends rearwardly of cavity 86.

As seen more clearly in Figs. 3 and 4, retaining member 85 is pivotally supported between lugs 74 and 75 of restraining member 70 by means of a pin 95 which extends through openings 80, 81 of lug portions 74, 75 respectively and opening 92 of coupon retaining member 85. Pin 95 is provided with a head 96 on one end portion thereof, the opposite end portion of the pin being threaded and receiving a correspondingly threaded nut 97 which serves to secure the pin in assembled position as shown in the drawings. The trunnion portions 71 and 72 of restraining member 70 are journaled within two similar bearings 100 and 101 respectively which extend through suitable openings 102, 103 formed laterally through beams 42, 41 respectively. Bearings 100 and 101 are secured in place relative to the body member by means of similar nut and bolt assemblies 105 which pass through suitable openings formed in beams 41 and 42, the upper two of these assemblies also serving to support brackets 106 and 107 respectively. Guide rails 110 and 111 which extend longitudinally of the body member and flare outward in a rearward direction are suitably secured as by welding to brackets 62, 106 and 61, 107 respectively, in the position as shown in the drawings for the purpose hereinafter described.

A second coupon retaining member 120 identical with coupon retaining member 85 shown in Fig. 6 is pivotally secured to the body member by means of a pin 121 which extends through aligned openings 122, 123 formed in beams 41, 42 respectively, and an opening 124 formed in the coupon retainer member. Pin 121 is provided with a head 125 on one end portion thereof, the opposite end portion of the pin being threaded and receiving a correspondingly threaded nut 126 which serves to secure the pin in assembled position as shown in the drawings. As seen more clearly in Fig. 4, the body member is provided with a cutout portion 127 formed therein permitting pivotal movement of coupon retainer member 120. Retainer member 120 is also provided with a cylindrical cavity 128 and suitable slots for receiving the coupon member similar to slots 87, 89 and 91 of coupon retainer member 85 in Fig. 6.

Fig. 7 illustrates a conventional breakable coupon member 129 adapted for use with the invention device, and it may be seen that it comprises a substantially cylindrical body portion 130 having two enlarged end portions 131 and 132 formed at opposite ends thereof. The center portion of the coupon is necked down at 133 and is formed in a precision manner such that the tensile strength of the coupon may be accurately predetermined.

Coupon member 129 is shown in operative position in Figs. 3 and 4, and it should be noted that the enlarged end portions 131, 132 of the coupon member are disposed within the cavities 86 and 128 of coupon retainer members 85 and 120 respectively. It is apparent that in the assembled position, the circumferential shoulder portions 140 and 141 formed adjacent the cavities in coupon retainer members 85 and 120 respectively serve to prevent the end portions of the coupon from escaping from the cavity within the coupon retainer members upon rupture of the coupon.

Operation of the device is as follows:

Assuming that the body member has been assembled and secured to the deck of a ship or other fixed means by bolt 16 and link 17, it is necessary to first insert a coupon in coupon retainer members 85 and 120. In order to do this, it is obvious that coupon retainer member 85 must be placed in a position closer to coupon retainer member 120 than is shown in Figs. 3 and 4. This is accomplished by rotating restraining member 70 such that the lug portions 74 and 75 thereof move in a forward direction. Coupon retainer members 85 and 120 may then be pivoted into alignment with one another and the enlarged end portions of a coupon may be inserted within the cavities of the coupon retainer members. The restraining member 70 is then rotated back into its operative position as shown in the drawings whereby the shoulder portions 140 and 141 of the coupon retainer members 85 and 120 respectively prevent the coupon member from escaping from the coupon retainer members.

An aircraft is then taxied into position such that the pendant extending downwardly from the rear of the fuselage of the aircraft travels along the deck and is guided by members 110 and 111 up along the rear end portion 40 of the body member between the guide members 110 and 111 into engagement with the restraining member as shown in Fig. 2. The pendant 150 is provided with a slot 151 therethrough which is adapted to receive the hook portion 73 of restraining member 70 as shown in Fig. 2 and the aircraft is then operatively connected to the invention device. It is evident that the thrust of the aircraft acting against the cam surface 76 on hook portion 73 of restraining member 70 tends to pivot the restraining member in a counterclockwise direction about its axis of rotation as seen in Fig. 4 thereby tending to separate the coupon container members and applying a tensile load to the coupon 129. Upon the development of a predetermined thrust by the aircraft, the tensile load applied to coupon 129 reaches a magnitude such that the coupon ruptures thereby permitting restraining member to rotate in a counterclockwise direction, disengaging hook portion 73 of the restraining member from the pendant of the aircraft and permitting the aircraft to move away from the invention device.

Referring to Fig. 4, it may be seen that as restraining member 70 rotates in a counterclockwise direction about its axis of rotation X—X coupon retainer 85 travels in an upward direction and strikes the lower surface of flange 46 of stop plate 45. In this manner, the stop plate serves to limit rotation of the restraining member thereby preventing excessive movement of coupon retainer member 85 such that the end portion of the coupon within retainer member 85 is prevented from flying out of the device.

After completion of one operation as described above, it is merely necessary to remove the two portions of the coupon from the coupon retainer members and insert a new coupon into the device in order to ready the invention device for another operation. It is evident that this is a simple operation which may be quickly and easily performed by the most inexperienced of operating personnel.

If the impact loads on the restraining member caused by stop plate 45 should prove excessive or undesirable, flange 46 of the stop plate may be replaced by a suitable conventional shock absorbing means 142 employing a resilient member formed of rubber or the like, the shock absorbing means being mounted either in the same position as flange 46 (see Fig. 1) or in another suitable position adjacent the restraining member such that it is adapted to engage and limit the rotation of the restraining member upon rupture of the coupon.

It is apparent from the foregoing that there is provided a new and novel holdback release device which is compact and may be easily secured to the deck of a ship and which may be automatically engaged without requiring additional personnel to secure the device to the pendant of an aircraft. The device incorporates an important safety feature in that the coupon portions are positively restrained in their movement after rupture thereof. The device is also simple and inexpensive in construction, and yet is extremely sturdy and reliable in operation.

Obviously many modifications and variations of the present invention are possible in the light of the above teachings. It is therefore to be understood that within the scope of the appended claims the invention may be practiced otherwise than as specifically described.

I claim:

1. A holdback release device which comprises a body means adapted to be secured in fixed position, first coupon retainer means pivotally supported by said body means and being adapted to receive one end portion of an elongate breakable coupon member, restraining means supported for rotation about an axis thereof by said body means, said restraining means having a hook portion extending in a direction substantially normal to said axis, second coupon retainer means being connected to said restraining means and being adapted to receive the opposite end portion of said breakable coupon member, said first and second coupon retaining means being movable in a direction longitudinally of the coupon member whereby any force on the restraining member tending to pull apart the first and second coupon retainer means will apply tension to the coupon member.

2. A device as defined in claim 1 including stop means for limiting rotation of said restraining means, after separation of the coupon member.

3. A device as defined in claim 2 wherein said stop means comprises a resilient shock absorbing means.

4. A holdback release device which comprises body means, means for securing said body means in fixed position, first coupon retainer means pivotally supported by said body means and being adapted to receive one end portion of a breakable coupon member, said first coupon retainer means having a slotted end portion and a cavity formed therein for receiving said one end portion of said breakable coupon member, restraining means supported for rotation about an axis thereof by said body means, said restraining means having a hook portion extending in a direction substantially normal to said axis, said restraining means also having a plurality of spaced lug portions extending in a direction substantially normal to said axis, second coupon retainer means pivotally supported by said lug portions and being adapted to receive the opposite end portion of said breakable coupon member, said second coupon retainer means having a slotted end portion and a cavity formed therein for receiving said other end portion of said breakable coupon member.

5. A device as defined in claim 4 including stop means for limiting rotation of said restraining means.

6. A device as defined in claim 4 wherein each of said coupon retainer means has shoulder means formed thereon adjacent the cavities therein for retaining the end portions of said coupon within the coupon retainer means subsequent to rupture of the coupon during operation of the device.

7. A holdback release device which comprises body means, bolt means pivotally secured to said body means for securing the body means in fixed position, guide means secured to said body means for guiding an aircraft pendant into operative position relative to the device, first coupon retainer means pivotally supported by said body means and having a first cavity formed therein, said first coupon retainer means also having a slotted end portion in communication with said first cavity and shoulder means formed thereon adjacent the cavity therein, restraining means supported for rotation about an axis thereof by said body means, said restraining means having a hook portion extending in a direction substantially normal to said axis, said restraining means also having a plurality of lug portions extending in a direction substantially normal to said axis, stop means supported by said body means for limiting rotation of said restraining means, second coupon retainer means pivotally supported by said lug portions and having a second cavity formed therein, said second coupon retainer means also having a slotted end portion in communication with said second cavity and shoulder means formed thereon adjacent the cavity therein.

References Cited in the file of this patent

UNITED STATES PATENTS 1,486,711    Wilcox    Mar. 11, 1924